No. 704,441. Patented July 8, 1902.
J. CROWTHER.
MEANS FOR PREVENTING DUST, DRAFT, AND RAIN FROM ENTERING UNDER DOORS.
(Application filed Jan. 15, 1902.)
(No Model.) 2 Sheets—Sheet 1.

Witnesses
Thomas Kilpatrick
H. Van Heerenbrinck

Inventor
John Crowther
by Alexander & Co
Attorneys

No. 704,441. Patented July 8, 1902.
J. CROWTHER.
MEANS FOR PREVENTING DUST, DRAFT, AND RAIN FROM ENTERING UNDER DOORS.
(Application filed Jan. 15, 1902.)
(No Model.) 2 Sheets—Sheet 2.
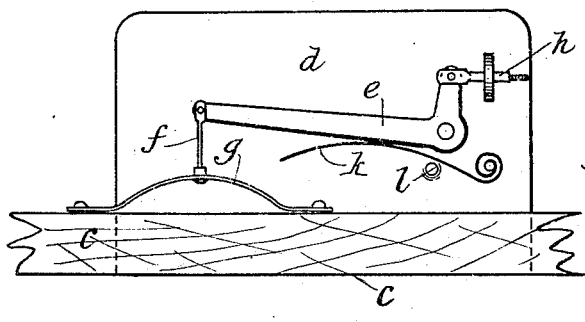
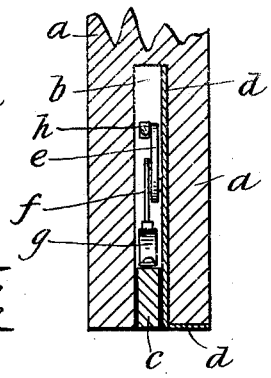
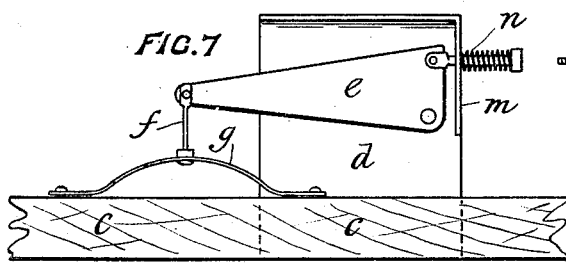
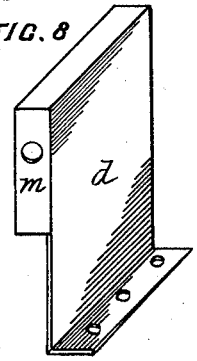
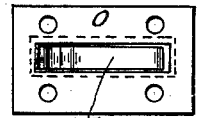
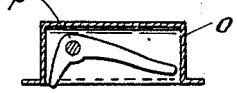
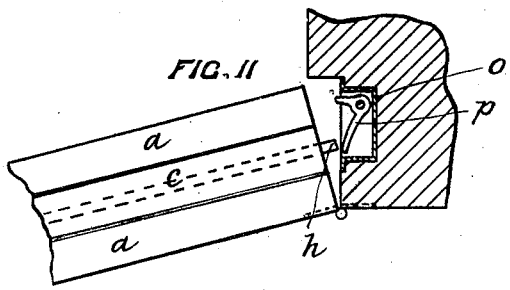

UNITED STATES PATENT OFFICE.

JOHN CROWTHER, OF INVERCARGILL, NEW ZEALAND.

MEANS FOR PREVENTING DUST, DRAFT, AND RAIN FROM ENTERING UNDER DOORS.

SPECIFICATION forming part of Letters Patent No. 704,441, dated July 8, 1902.

Application filed January 15, 1902. Serial No. 89,888. (No model.)

*To all whom it may concern:*

Be it known that I, JOHN CROWTHER, a subject of the King of Great Britain, residing at Tweed street, Invercargill, New Zealand, have invented a new and useful Means for Preventing Dust, Draft, and Rain from Entering under Doors; and I do hereby declare the following to be a full, clear, and exact description of the same.

This invention relates to that class of device for preventing dust, draft, and rain from entering beneath doors which consists of a drop-board or shutter that is caused to fall when the door is shut and tightly close the crack generally found beneath the doors and which as the door is opened will be raised up from contact with the floor, so that the door may be opened or closed without any drag. The invention consists specially in the means provided for carrying out these operations.

The bottom edge of the door is formed with a groove therein of sufficient depth to allow of the drop-board or shutter lying therein. This drop-board is connected at its center with one arm of a two-armed lever pivoted above it and the other arm of which extends upward and is provided with an extension-rod that extends longitudinally through the door and projects a slight distance upon the hinge end of it. The door-jamb is provided with a bearing-plate or other suitable device, with which the end of the extension-rod will engage when the door is closed, so that its projection shall be pushed in and the lever caused to turn enough to press the drop-board down. A spring is provided for causing the drop-board to be drawn up when the door is opened.

In order that the invention may be properly understood, reference will be made to the accompanying sheets of drawings, in which—

Figure 1:
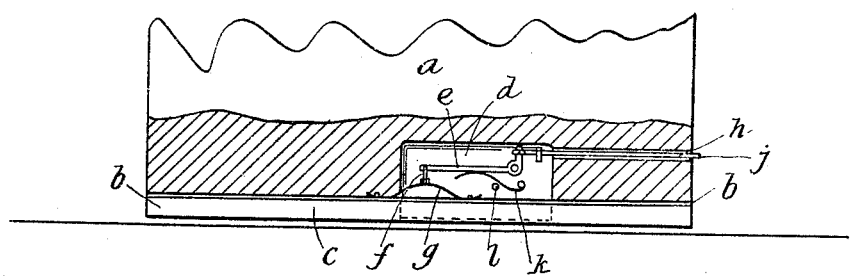
Figure 2:
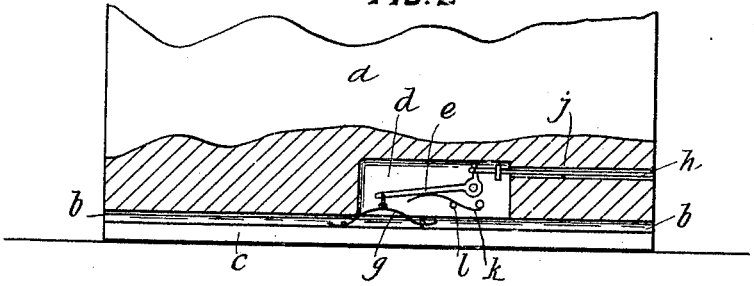
Figure 3:
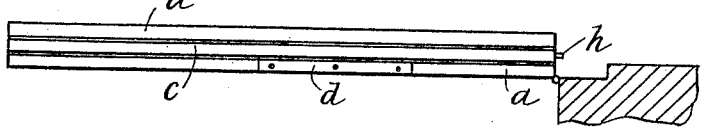
Figure 4:
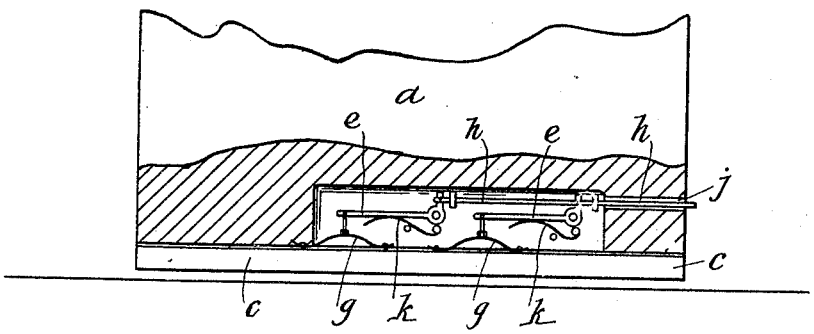

Figure 1 is a sectional elevation of a door, showing one manner of carrying out my invention and with the drop-board in its raised position. Fig. 2 is a similar view, but with the drop-board down. Fig. 3 is an underneath plan of the door. Fig. 4 is a similar view to Fig. 1, but with two levers, as would be used in the case of wide doors. Fig. 5 is a detail, on an enlarged scale, of the drop-board and its lever attachments. Fig. 6 is a cross-section of the same shown fitted within the bottom of a door. Fig. 7 is a detail of an alternative form of lever for actuating the drop-board. Fig. 8 is a perspective view of the bearing-frame for the lever shown in Fig. 7. Figs. 9 and 10 are respectively front elevation and sectional plan of a device to be attached to the door-jamb, so as to insure that the drop-board shall not drop until the door is completely closed and shall be raised as soon as the door begins to open. Fig. 11 is an underneath plan of part of a door hinged to the jamb and illustrating the manner of operation with regard to the device shown in Figs. 9 and 10.

$a$ is the door, which is formed with a groove $b$ in the bottom edge thereof. In this groove fits the drop-board or shutter $c$, which is made of the same length as the width of the door and which may be of any suitable material. The bottom edge of the drop-board may also, if desired, have attached to it a rubber cushion, so that it shall make close contact with the floor. The groove $b$ is formed at one part of a deeper depth than the rest, and in this well or depression is fixed the plate $d$, upon which is pivotally fastened the right-angled lever $e$. One arm of this lever is made longer than the other and extends to a point above the middle of the drop-board $c$, to which it is connected by means of the small connecting-rod $f$, secured to a bow-spring $g$, the ends of which are fastened to the top of the drop-board by means of pins driven through slots in the spring, so as to allow of the spring being depressed in case of any impediment under the drop-board, thus preventing damage to the mechanism. The center of the spring-bow is of sufficient height above the top of the drop-board $c$ to compensate for the distance the drop-board has to fall to touch the floor, the slots being of sufficient length to allow of the spring flattening out. The short arm of the lever extends upward and has connected to its end a connecting-rod $h$, that is passed through a longitudinal hole $j$, bored in the door, and projects a short distance from its end, as shown in Figs. 1, 3, 4, and 11. This rod may be secured to the lever in any approved way. In the drawings it is shown as being screwed into a short connection fixed to the lever after being passed through the hole $j$.

Fixed to the plate d beneath the lever e is a flat spring k, which bears in an upward direction against the bottom of the lever e and serves to keep it up, and consequently keep the drop-board c from contact with the floor. This spring is provided with a tension-pin l, upon which it rests.

In Fig. 4 two levers e are shown, the rod h being connected to the short arm of each, so that they shall both be caused to act simultaneously and each being provided with a spring g.

Fig. 7 shows an alternative form of lever, which in this case is constructed of one triangular piece, as shown, to which the connecting-rod h and drop-board c are connected in the same manner as heretofore described. The lever is pivoted against the face of the bearing-plate d, which is formed with an end flange m with a hole therein, as shown in Fig. 8, through which passes the rod h. This rod is enveloped by a helical spring n, which is in compression, and whose ends bear against the face of the flange and an enlargement upon the rod. The spring serves to keep the lever drawn up, so that the drop-board shall be free from the floor.

The hinge-jamb of the doorway is provided with any suitable bearing-plate, against which the end of the rod h will bear when the door is closed. Thus by closing the door the rod h shall be pushed in, which will have the effect of causing the lever e to turn and its long arm to press down upon the drop-board c and cause its bottom edge to rest upon the floor. Directly the door is opened the bow-spring g, in conjunction with either the springs k or n, as the case may be, will force the lever up again, which will draw up with it the drop-board, so that it shall lie in its groove.

In some cases it is advisable that the drop-board should not drop until the door has been entirely closed and shall rise as soon as the door starts to open. To effect these objects, the device shown in Figs. 9, 10, and 11 has been devised. It consists of a frame o, that is formed with a well or depression therein, in which is pivoted a two-armed lever p. This frame is let into the jamb of the doorway, so that the lever shall lie horizontally. One arm of the lever p is made longer than the other and is placed in such a position in relation to the projecting end of the rod h that when the door is being closed it will engage therewith, causing it to be forced inward and the shorter arm to project outside the well or depression. This shorter arm is on the inside of the jamb and farthest from the hinge, so that when the door is almost closed its edge shall press against the end of the arm and cause the lever to be turned back again, so that its long arm shall press the rod h in and cause the drop-board c to drop. As soon as the door starts to open again the pressure upon the end of the small arm of the lever will be removed, so that the rod h shall be free to be forced out again and the drop-board drawn up instantly.

What I claim as my invention, and desire to secure by Letters Patent, is—

1. A drop-board or shutter extending across the width of the door and fitting within a groove in the bottom edge thereof, a lever pivoted above it which is connected therewith, a rod or shaft extending laterally through the door and projecting beyond the edge thereof and connected with the lever, in combination with a small two-armed lever pivoted within the hinge-jamb of the doorway and so adjusted with regard to the door that when the same is closed the projecting end of the rod or shaft shall engage with one arm of the lever, while the edge of the door shall engage with and press upon the other arm, as herein specified.

2. In means for preventing dust draft and rain from entering under doors, a drop-board or shutter extending across the width of the door and fitting within a groove in the bottom edge of the door and extending across the width thereof, a drop-board or shutter fitting within the groove, a frame secured within the groove, a two-armed lever pivoted to the frame, above the drop-board, a bow-spring secured to the top edge of the drop-board by means of pins passed through slots therein, a connecting-piece connecting one arm of the lever with the center of the bow-spring, and means whereby the lever may be depressed and raised, as the door is closed and opened, as herein specified.

In testimony whereof I have signed this specification in the presence of two subscribing witnesses.

JOHN CROWTHER.

Witnesses:
CHAS. S. LOUGUET,
GEO. I. A. RICHARDSON.